US006223985B1

(12) United States Patent
DeLude

(10) Patent No.: US 6,223,985 B1
(45) Date of Patent: May 1, 2001

(54) SYSTEM AND METHOD FOR PROTECTING UNAUTHORIZED ACCESS INTO AN ACCESS-CONTROLLED ENTITY BY AN IMPROVED FAIL COUNTER

(76) Inventor: Bethany J. DeLude, 209 Woodloch La., Severna Park, MD (US) 21146

( * ) Notice: Subject to any disclaimer, the term of this patent is extended or adjusted under 35 U.S.C. 154(b) by 0 days.

(21) Appl. No.: 09/324,386

(22) Filed: Jun. 3, 1999

Related U.S. Application Data

(60) Provisional application No. 60/088,794, filed on Jun. 10, 1998.

(51) Int. Cl.[7] .......... G06K 5/00

(52) U.S. Cl. .......... 235/382; 235/379; 235/380

(58) Field of Search .......... 235/380, 379, 235/382

(56) References Cited

U.S. PATENT DOCUMENTS 5,594,227 1/1997 Deo .

*Primary Examiner*—Harold I. Pitts

(74) *Attorney, Agent, or Firm*—Law Offices of Royal W. Craig

(57) ABSTRACT

An access control system that incorporates a fail count that is decremented upon entrance of the correct PIN (or password) and incremented upon entrance of an incorrect PIN. Access to a system is denied until the fail counter is equal to one less than its reference value. It becomes increasingly difficult to exhaust over all the possible PINs because the correct PIN needs to be entered and re-entered repeatedly depending on the number of prior incorrect entries. Moreover, an unauthorized user receives no indication when a correct PIN is entered because the entity will not automatically unlock. The access control system can be used for protecting unauthorized access into any access-controlled entity such as bank accounts when a PIN is used in conjunction with a magnetic strip card, or an employee badge to control access to a controlled facility, or into any existing or future computer architectures. A mathematical analysis is provided to show the reduction in time and overhead hardware necessary for implementation.

10 Claims, 1 Drawing Sheet

SYSTEM AND METHOD FOR PROTECTING UNAUTHORIZED ACCESS INTO AN ACCESS-CONTROLLED ENTITY BY AN IMPROVED FAIL COUNTER

CROSS-REFERENCE TO RELATED APPLICATIONS

The present application is based upon and gains priority from U.S. Provisional Patent Application Ser. No. 60/088,794, filed: Jun. 10, 1998 by the inventor herein and entitled "SYSTEM AND METHOD FOR PROTECTING UNAUTHORIZED ACCESS INTO AN ACCESS-CONTROLLED ENTITY VIA THE INTEGRATION OF AN IMPROVED FAIL COUNTER INTO THE PASSWORD, PASS PHRASE OR PERSONAL IDENTIFICATION NUMBER (PIN) VALIDATION PROCESS".

BACKGROUND OF THE INVENTION

1. Field of the Invention

The present invention relates to access control mechanisms for preventing unauthorized access and, more particularly, to an improved system that integrates a unique fail counter in the password, pass phrase or personal identification number (PIN) validation process.

2. Description of the Background

Today, many products, devices and/or systems rely on passwords, pass-phrases or personal identification numbers (PINs) to serve as an access control mechanism. One of the security challenges related to these access control mechanisms (heretofore collectively referred to as PINs) is the determination of an optimal PIN length and character composition. Obviously, a longer PIN created from a complex character set will be harder to guess than a short PIN created from a restricted character set. Unfortunately, it will also be harder for the user to remember. In order to enhance the level of security afforded to a system that uses a PIN as an access control mechanism, it is advisable to incorporate a fail counter into the PIN validation routine.

Incorporating a fail counter into the PIN validation routine is a simple task which can be accomplished via hardware, software, and/or firmware. Typically, a comparator compares the entered PIN to the correct PIN. Of note, the correct PIN is typically stored on a token or in a database. A fail counter keeps count of failed attempts. A number of actions can be taken when an individual consistently re-enters bad PINs. For instance, the system managers can be alerted to the possibility that an unauthorized access has been attempted. In addition, the system may in prevent further access attempts after a certain number of failed attempts.

U.S. Pat. No. 5,594,227 discloses a system and method for protecting unauthorized access to data contents using a cumulative fail counter. The fail counter keeps a fail count LD indicative of the number of times that an entered password fails to match a stored password. The fail counter is incremented when the entered password fails to match the stored password and decremented when the entered password successfully matches the stored password. In addition to the fail count, a separate delay counter maintains a delay count that is incremented each time the access is attempted, regardless whether successful or not. Whenever the fail count is not equal to its starting value of zero access is denied. Access is denied even though a match might occur after initial misses because the fail count is not zero. Further, when access is denied, a delay period is imposed before comparing the next entered password received from the smart card terminal. The delay period increases each time based upon a function of the delay count. While the '227 patent reduces the chance of unauthorized access, it is a cumbersome implementation. First, a delay counter must be employed in tandem with the fail counter. Second, when access is denied a delay period is imposed before processing the next entry. This is tedious for legitimate users who have mistakenly typed the wrong PIN. Moreover, the cumulative result is longer lines at the card terminal. Third, the '227 implementation is geared specifically toward smart cards and other integrated circuit cards. It would be greatly advantageous to develop an access control system that requires fewer steps to implement, does not require a timing mechanism (for a delay counter or otherwise), and that is easier to integrate into all existing and future access control architectures.

SUMMARY OF THE INVENTION

It is, therefore, an object of the present invention to provide an improved system and method for protecting unauthorized access into an access-controlled entity (such as bank accounts when a PIN is used in conjunction with a magnetic strip card, or an employee badge to control access to a controlled facility) by an improved fail counter.

It is another object to provide an improved system and method for protecting unauthorized access that uses judicious mathematical analysis to improve protection to any access controlled entity while reducing the time and overhead hardware necessary for implementation.

It is still another object to eliminate the need for any timing mechanism (such as a delay counter), and to enable integration into any existing or future computer architectures.

In accordance with the above and other objects, the present invention relies on a fail count that is decremented upon entrance of the correct PIN (or password) and incremented upon entrance of an incorrect PIN. For the purposes of the invention, the fail counter is initially set to 1. However, the initial setting can be adjusted in accordance with the needs of any specific implementation. Access to the system is denied until the fail counter is equal to its reference value (zero, in this example). Therefore, if the PIN is correctly guessed on the $i^{th}$ entry ($i-1$ failed entries), then the correct PIN needs to be entered i times to gain access to the entity. Hence, it is increasingly difficult to exhaust over all the possible PINs because the correct PIN needs to be entered and re-entered repeatedly depending on the number of prior incorrect entries. Moreover, an unauthorized user receives no indication when a correct PIN is entered because the entity will not automatically unlock.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
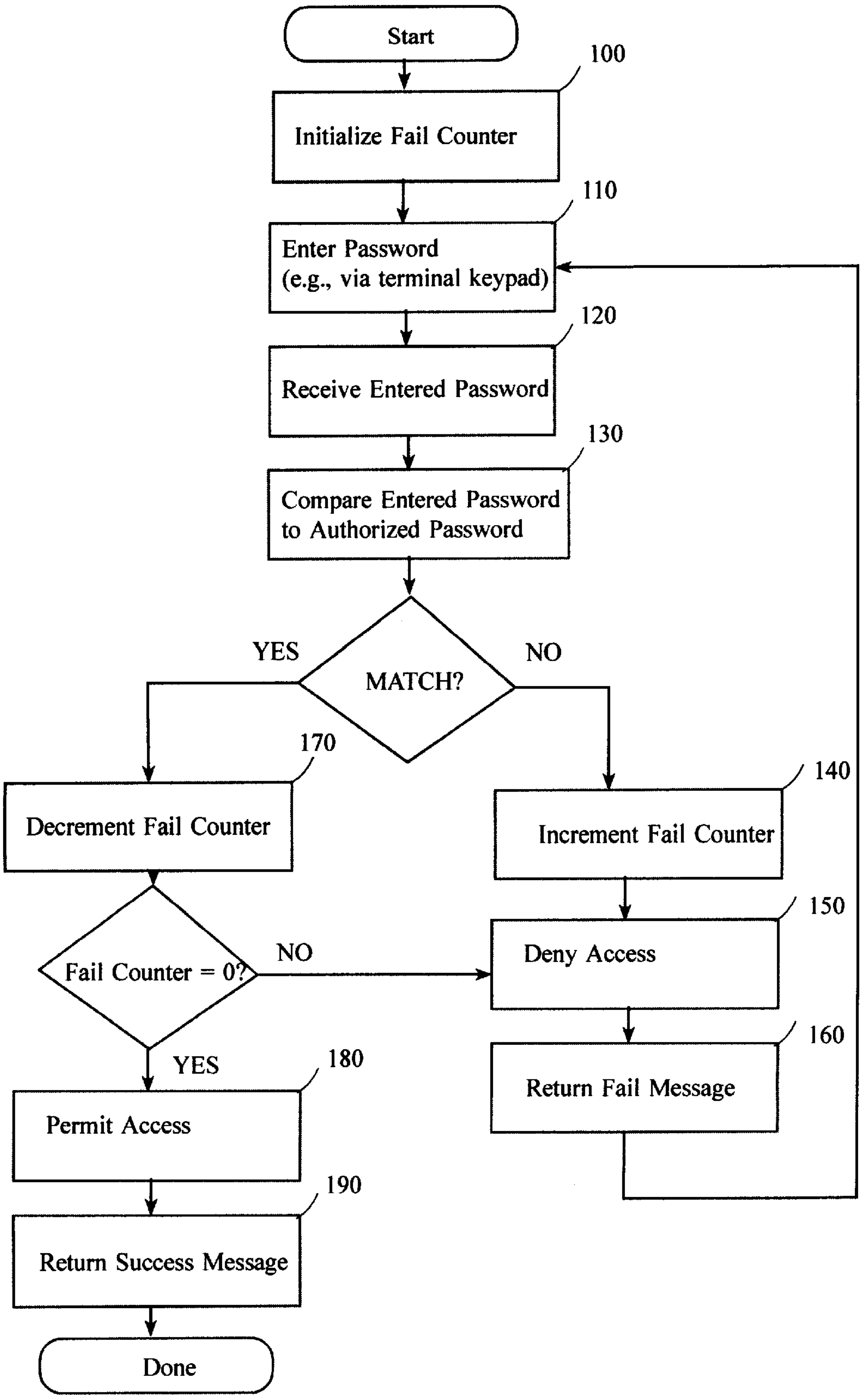
FIG. 1 is a flow chart representation of the method for protecting unauthorized access into an access-controlled entity using the improved fail counter according to one embodiment of the present invention.

The fail counter method according to the present invention may be practiced using any well-known combination of hardware, software, and/or firmware capable of comparing an entered PIN to the correct PIN and keeping track of the result.

The correct PIN is typically stored on a magnetic key, key card, smart card, token, in a database, or elsewhere. The user tries to gain access via a keypad or touch pad. A fail counter keeps count of failed attempts. In a general sense, the method of the present invention entails decrementing the fail counter upon entrance of the correct PIN and incrementing the same upon entrance of an incorrect PIN. Access will be denied until the fail counter is equal to one less than its reference value. Therefore, if the PIN is correctly guessed on the $i^{th}$ entry (i–1 failed entries), then the correct PIN needs to be entered i times to gain access to the entity. Hence, it is increasingly difficult to exhaust over all the possible PINs because the correct PIN must be entered not once, but repeatedly (for the number of prior incorrect entries plus 1). Also, the unauthorized user receives no indication when a correct PIN has been entered because the entity will not automatically unlock (the fail counter must have been properly decremented to zero). Therefore, users who consistently must re-enter PINs are alerted to the possibility that an unauthorized individual may have attempted to access their terminal/device/equipment.

FIG. 1 is a flow chart representation of the method for protecting unauthorized access into an access-controlled entity using the improved fail counter according to one embodiment of the present invention.

At step 100, the fail counter is initialized at its reference value, e.g., 1. For the purposes of the present disclosure, the fail counter is initially set to 1. However, this initial setting can be adjusted in accordance with the needs of any specific implementation. At this point, it is helpful to distinguish between "unique PIN" and "entry". A unique PIN is a PIN of length n which has not previously been entered as the correct PIN. An entry is an input of a PIN. The total number of entries required to unlock the terminal/device/equipment/module is equal to the total number of previous entries plus the fail counter value.

At step 110, the user enters a password (or PIN). The access control system receives the password at step 120 and at step 130 compares the entered password from step 110 with a predetermined authorized password.

If the first entered password is correct, the fail counter is decremented to 0 at step 170. When the fail counter reaches zero, access to the system is granted as at step 180 and an "Access Granted" message is returned at step 190. The access control routine ends.

On the other hand, if the first entered password fails, the fail counter is incremented from 1 to 2 at step 140. Until the fail counter reaches zero, access to the system is denied. Thus, access is denied at step 150 and an "Access Failure" message is returned at step 160. The access control routine continues, but at all times the user is able to immediately try again. There is no delay.

The utility of the present method becomes apparent from the length of time required by an unauthorized user to defeat this mechanism for varying PIN lengths. For this analysis, a hypothetical test rate of 10,000 PIN entries per minute is used. Next, for the purpose of comparing the impact of the present fail counter with an implementation which does not use a penalty device, the same processing time is used to calculate the length of time it would take to defeat the same entity without the fail counter.

A. Expected Number of Tries Before Guessing the PIN

In order to determine the expected number of tries before guessing the PIN, it is first necessary to observe the relationship between a unique guess, the number of times the guess would need to be entered to decrement the fail counter to zero, and the status of the fail counter. Also, it is necessary to observe the rate at which these entities increase with each failing guess. It is assumed that an unauthorized user understands the scheme and, therefore, realizes that each successive guess needs to be entered enough times to sufficiently decrement the fail counter. The result is summarized in Table 1.

TABLE 1

Impact of Failed Attempts

| Unique PINs | Total # of Entries (I + total # entries) | Fail Counter |
|---|---|---|
| 0 | 0 | 1 |
| 1 | 1 | 2 |
| 2 | 3 | 4 |
| 3 | 7 | 8 |
| n | $2^n - 1$ | $2^n$ |

The key to the security lies in the exponentially increasing fail counter and, hence, the exponentially increasing number of times a unique guess needs to be entered in an attempt to ensure that the correct guess sufficiently decrements the counter to unlock the entity. It is important to understand that it is not sufficient merely to calculate merely the number of unique PINs which must be entered to guess the correct PIN. It also becomes necessary to calculate the number of times each subsequent PIN must be entered in order to decrement the fail counter. The time it takes to process each entry (regardless of whether the entry is a new PIN or, rather, a re-entry of the same PIN in order to sufficiently decrement the fail counter) is the critical component. In the present invention, it is this processing time that effectively precludes an exhaustion attack.

Given the results in Table 1 as well as the assertion that the probability that any particular guess of an all numeric, 0–9, PIN is correct equals $10_{-n}$ where n is the PIN length, it is now possible to determine the expected number of entries required to unlock the entity as follows.

Expected # tries before correct PIN is entered (where i is the number of unique guesses, and n is the PIN length)=

$$10^{-n}\left[\sum_{i=1}^{10^n}(2i-1)\right]$$

This expression is equivalent to $10^{-n}[2^{(10\hat{}n)+1}-2-10^n]$. Having developed an equation for the expected number of entries performed before the correct PIN is entered a sufficient number of times to decrement the fail counter to zero, it is possible to evaluate the equation for specific PIN lengths. To begin with, consider the case of a four digit numeric PIN. The unauthorized user would need to make the following number of entries before decrementing the counter to zero: evaluating $10^{-4}[2^{(10\hat{}4)+1}-2-10^4]$ where n=4 is. . .

$$10^{-4}[2^{(10\hat{}4)+1}-2-10^4]=10^{-4}[2^{(10001)}-2-10^4]\sim10^{-4}[10^{3011}]10^{-3007}$$

entries.

The results of evaluating this equation for n=1, 2, 3, 4 are captured in Table 2.

TABLE 2

| Expected Number of Entries to Guess a Numeric PIN | |
|---|---|
| PIN Length | Expected # of Entries |
| 1 | 204 |
| 2 | $10^{29}$ |
| 3 | $10^{297}$ |
| 4 | $10^{3007}$ |

Alternatively, it would take $10^4$ entries to guess a 4 digit numeric PIN in an application that does not use a fail counter. Realistically, however, the 4-digit numeric PIN would have been guessed halfway through for a total of 5000 entries.

B. Approximate Time to Exhaust Over a Given Number of PIN Entries

Having calculated the approximate number of entries needed to unlock a device or other entity using a PIN of length 1, 2, 3, or 4, it is necessary to calculate the amount of time required to process these entries. In order to compare timing information with and without the fail counter mechanism of the present invention, the same processing time is used for both cases. Specifically, the assertion that the 10,000 PINS per minute can be tested is used to calculate the timing. Of course, the actual timing of any given system will vary. The calculations herein may be adjusted accordingly. The results of using the fail counter and a processing time of 10,000 PINs per minute are captured in Table 3.

TABLE 3

| Expected Time (in Minutes) to Guess a Numeric PIN Using the Method of the Present | | |
|---|---|---|
| Invention: PIN Length | Expected Time to Success with Fail Counter | Expected Time to Success without Fail Counter |
| 1 | .02 | .0005 |
| 2 | $10^{25}$ | .005 |
| 3 | $10^{293}$ | .05 |
| 4 | $10^{3003}$ | .5 |

Clearly, the results captured in Table 3 demonstrate the appreciable boost to security provided by the fail counter of the present invention. Hence, with tile fail counter implemented as proposed, the same numeric PIN of length 4 which previously was easily guessed, now, poses negligible risk to the user.

In addition to the fact that for all PIN lengths the expected time to success is greater for the tall counter implementation, the rate at which this expected time increases with a unit increase in PIN length is significantly greater. Specifically, with the fail counter, the expected time is increasing at a rate of approximately $2^{10^n}$ versus a rate of $2^{3.3n}$ without the fail counter. Of note, the following expression is the expected number of minutes required to succeed:

$$\left[10^{-n}\left(\sum_{i=1}^{10^n}(2i-1)\right)\right]\div k$$

In this equation, k is the number of entries which can be processed in one minute. In our analysis, k~$10^4$ because the hypothetical processor is able to process approximately $10^4$ PINs per minute.

C. Approximate Probability of Successfully Guessing the PIN in a Given Time Period Using the Fail Counter of the Present Invention If this design is used, it is important to know the probability of successfully guessing the PIN in a specific time period. This data is captured for a numeric PIN of length 4 in Table 4.

TABLE 4

| Approximate Probability of Successfully Guessing a Numeric PIN of length 4 in a Given Time Period | |
|---|---|
| Time Period | Approx. Probability |
| 1 hour | .0019 |
| 1 day | .0024 |
| 1 week | .0027 |
| 1 month | .0029 |
| 1 year | .00321 |

Using the 1 hour time period as an example, the approximate probability was calculated as follows.

1. One hour=60 minutes. Using the hypothetical timing information, 600,000 PIN entries (10,000×60) are processed in an hour.
2. 600,000~$2^{19}$ which means that approximately 19 unique PINs may be entered in an hour. In general, the number of unique PINs which can be guessed is the $\log_2$ of the total # PIN entries that can be processed in the given time period.
3. Therefore, the approximate P(successfully guessing the correct 4 digit PIN in an hour)=19/$10^4$=0.0019.

This calculation is repeated for the remaining time periods.

III. User Support

As noted from the beginning, it is important to select a PIN and an implementation which is supported by the user community. In anticipation of user concern that a few incorrect PIN entries may place an undue burden on the user community to have to countermand each wrong entry with a correct entry in order to properly decrement the fail counter, it is advisable to calculate the impact to security of allowing a user 3 incorrect guesses before incrementing the fail counter.

A. Expected Number of Tries Before Guessing the PIN

As before, the analysis begins by observing the relationship between a unique guess, the number of times the guess would need to be entered to decrement the fail counter to zero, and the status of the fail counter. Also, it is necessary to observe the rate at which these entities increase with each failing guess. This is summarized in Table 5.

TABLE 5

| Impact of Failed Entries with Three Allowed Failures | | |
|---|---|---|
| Unique PINs | Total # Entries | Fail Counter |
| 0 | 0 | 1 |
| 1 | 1 | 1 |
| 2 | 2 | 1 |
| 3 | 3 | 1 |
| 4 | 4 | 2 |
| 5 | 6 | 4 |
| 6 | 10 | 8 |
| ... | ... | ... |
| n | $2^{t-3}+2$ for $3 \leqq t \leqq 10^n$ | $2^{t-3}$ for $3 \leqq t \leqq 10^n$ |

Of note, the formula $2^{t-3}+2$ could be rewritten as $2^{t-m}+(m-1)$ for an m-entry delay and $m \leqq t \leqq 10^n$.

Given the results in Table 5 as well as the assertion that the probability that any particular guess at random is correct equals $10^n$ where n is the PIN length, it is now possible to determine the expected number of entries required to unlock the card as follows: the expected # tries before correct PIN is entered (where i is the number of unique guesses after the nth allowed incorrect guess and n is the PIN length)=

$$10^{-n}\left\{\left[\sum_{i=m+1}^{10^n}(2^{i-m}+(m-1))\right]+m+(m-1)+\ldots+1\right\}$$

For the implementation in which 3 incorrect entries are permitted before the fail counter begins to increment, this expression is equivalent to:

$$10^{-n}\left[\sum_{i=4}^{10^n}(2^{i-3}+2)+6\right]$$

This expression can be rewritten as:

$$10^{-n}\left[\sum_{i=1}^{10^n-3}(2^{i}+2)+6\right]$$

This expression is equivalent to:

$$10^{-n}[2^{(10^{n}-2)}-2+2(10^{n})]=10^{-n}(2^{(10^{n}-2)}-2(10^{-n})+2.$$

Now, solving this expression for a numeric PIN of length four is approximately $10^{3006}$. The results of evaluating this equation for n=1, 2, 3, 4 are captured in Table 6.

TABLE 6

Expected Number of Entries to Guess a Numeric PIN with 3 Allowed Failed Entries

| PIN Length | Expected # of Entries |
|---|---|
| 1 | 26 |
| 2 | $10^{28}$ |
| 3 | $10^{296}$ |
| 4 | $10^{3006}$ |

When the expected number of entries calculated above is compared to the expected number of entries calculated in Table 2, the difference is insignificant.

3. Approximate Time to Exhaust Over a Given Number of PIN Entries

As before, it is desirable to calculate the amount of time required to process these entries using the timing data from the hypothetical processor. The resultant times are captured in Table 7.

TABLE 7

Expected Time (in Minutes) to Guess a Numeric PIN using the Hypothetical

| Processor: PIN Length | Expected Time to Success with Fail Counter | Expected Time to Success with Fail Counter and 3 allowed Failed entries | Expected Time to Success without Fail Counter |
|---|---|---|---|
| 1 | .02 | .0026 | .0005 |
| 2 | $10^{25}$ | $10^{24}$ | .005 |
| 3 | $10^{293}$ | $10^{292}$ | .05 |
| 4 | $10^{3003}$ | $10^{3003}$ | .5 |

C. The Impact to Security of Allowing Five and Ten Failed Entries Before Incrementing the Fail Counter In the event that allowing three failed entries before incrementing the fail counter is not amenable to the user community, it is interesting to examine the impact of allowing five and ten failed entries. As before, we will calculate the expected number of entries to guess a numeric PIN as well as the expected time to success with either five or ten allowed failed entries. To begin with, when five incorrect entries are permitted, the following equation is used:

$$10^{-n}\left[\sum_{i=6}^{10^n}(2^{i-5}+4)+15\right]$$

This expression can be rewritten as:

$$10^{-n}\left[\sum_{i=1}^{10^n-5}(2^{i}+4)+15\right]$$

This expression is equivalent to $10^{-n}[2^{(10^{n}-4)}-2+4(10^{n})-20]+15(10^{-n})=10^{-n}[(2^{(10^{n}-4)}-2+4(10^{n})-20]+15(10^{-n})=10^{-n}(2^{10^{n}-4})-7(10^{-n})$.

Next, it follows from our previous analysis that the following equation is used when ten incorrect entries are allowed:

$$10^{-n}\left[\sum_{i=11}^{10^n}(2^{i-10}+9)+55\right]$$

This expression can be rewritten as:

$$10^{-n}\left[\sum_{i=1}^{10^n-10}(2^{i}+9)+55\right]$$

This expression is equivalent to $10^{-n}[2^{(10^{n}-9)}-2+9(10^{n}-10)]+55(10^{-n})=10^{-n}[(2^{(10^{n}-9)}-2+9(10^{n})-90]+55(10^{-n})=10^{-n}(2^{10^{n}-9})-37(10^{-n})+9$.

Now, it is possible the calculate the expected number of entries for both cases. The results of evaluating both of these equations for n=1, 2, 3, 4 are captured in Table 8.

TABLE 8

| Expected Number of Entries to Guess a Numeric PIN with 5 and 10 Allowed Failed Entries. | | |
|---|---|---|
| PIN Length | Expected # of Entries wi 5 allowed failures | Expected # of Entries wi 10 allowed failures |
| 1 | 9.7 | 5.5 |
| 2 | $10^{27}$ | $10^{25}$ |
| 3 | $10^{297}$ | $10^{295}$ |
| 4 | $10^{3005}$ | $10^{3004}$ |

Lastly, using the timing data for the hypothetical processor, it is possible to calculate the expected time to guess a numeric PIN. This data is captured in Table 9.

TABLE 9

| Expected Time (in Minutes) to Successfully Guess a Numeric PIN Using the Hypothetical Processor. If Failed Entries Are Allowed, the Number of Allowed Failed Entries Will Appear in Parentheses. | | | | | |
|---|---|---|---|---|---|
| PIN Length | Fail Counter (0) | Fail Counter (3) | Fail Counter (5) | Fail Counter (10) | No Fail Counter |
| 1 | .02 | .0026 | .00097 | .00055 | .0005 |
| 2 | $10^{25}$ | $10^{24}$ | $10^{23}$ | $10^{21}$ | .005 |
| 3 | $10^{293}$ | $10^{292}$ | $10^{293}$ | $10^{291}$ | .05 |
| 4 | $10^{3003}$ | $10^{3002}$ | $10^{3001}$ | $10^{3000}$ | .5 |

From Table 9, a few observations can be made. First, in all cases, the time to successfully guess a numeric PIN is significantly increased using a fail counter. Next, the impact of allowing a few failed entries before incrementing the fail counter appears to have relatively insignificant impact on the time required to successfully guess the PIN. Hence, it appears feasible to allow users a small number of failed attempts before activating the fail counter. The trade-off with PIN length is that s-allowed failed attempts increases the risk to the system that the PIN will have the opportunity of being successfully guessed during the first sentries. Specifically, P(successfully guessing a numeric, n-length PIN given s-allowed failed entries)=$s \times 10^{-n}$ since there is no penalty per se imposed by the fail counter. Effectively, the work to exhaust is reduced by $2^s$ where s is the number of allowed failed entries.

IV. Conclusions

The analysis presented herein indicates that the fail counter implementation according to the present invention enhances security significantly. The key to the security lies in the exponentially increasing fail counter and, hence, the exponentially increasing number of times a unique guess needs to he entered in an attempt to ensure that the correct guess sufficiently decrements the counter to unlock the system. Related, because no indication is given that the correct PIN was entered, it is necessary for an unauthorized user to exhaust in a specific manner. Otherwise, the unauthorized user will never unlock the system unless the correct PIN is entered on the first attempt. Hence, it is of paramount importance to understand that it is not sufficient to calculate merely the number of unique PINS which must be entered to guess the correct PIN. Moreover, it is necessary to calculate the number of times each subsequent PIN must be entered in order to decrement the fail counter. The time it takes to process each entry (regardless of whether the entry is a new PIN or, rather, a re-entry of the same PIN in order to sufficiently decrement the fail counter) is the critical component because the processing time is the critical element which effectively precludes an exhaustion attack.

By implementing the proposed fail counter scheme, users are able to use PINS in a more secure manner than in comparable implementations which do not employ the fail counter as described herein. For any specific implementation, the expected time required to successfully guess the PIN needs to be calculated in accordance with the timing information of the entity under study. As technology speeds up the processing time, it may be necessary to investigate stronger penalty mechanisms. In addition to using shorter PINS, users who must consistently re-enter PINS are alerted to the possibility that an unauthorized individual has attempted to gain access to their secure system.

When implementing the fail counter, it is important to recognize that the fail count should be protected as a critical value. Some methods to protect the fail counter include, but are not limited to:

Extending the tamper protection mechanism, such as a tamper loop, to provide the same protection to the fail counter as is provided to other critical system values, Implementing the counter redundantly to provide protection against a failure;

Implementing a cryptographic checksum on the fail counter value which is checked each time the counter is to be incremented or decremented. If the current value does not match the value indicated by the checksum, then the fail counter has been altered or has malfunctioned.

It may be necessary to prevent an unauthorized user from inputting many incorrect PIN entries to increment the fail counter sufficiently high to render the system useless. A limited try counter in which the upper limit of tries is high may be implemented to prevent this. Typically, the limited try counter will "lock-up" the system after ten or so incorrect entries. In this instance, it requires substantially more entries to lock up the system than when the upper limit of tries is low as in conventional access control systems. Also, in implementations for which users do not want to risk exceeding the limited try counter and losing the ability to access/operate the system, the fail counter of the present invention reduces this risk. In other words, a valid user can not inadvertently lock oneself out of the system. Also, an unauthorized user who has access to the access controlled entity could, simply, steal, substitute, or otherwise break the entity to preclude its use.

Clearly, for implementations in which the PIN serves as the primary access control mechanism, it is desirable to pursue implementing a fail counter according to the present invention. It is equally possible to incorporate this design across other platforms such as a cellular phone system, a building, or a computer system.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. For example, the penalty aspect of the fail counter can be implemented in other ways, e.g., the fail counter can be incremented by one for the first ten incorrect entries and then exponentially thereafter. Also, both the reference value and the initial setting of the fail counter can be manipulated. The combinations are endless and can be tailored for the protection needs of the particular implementation. It is to be understood, therefore, that the invention may be practiced otherwise than as specifically set forth herein.

I claim:

1. A method of controlling access to a system comprising the following steps:

initializing a fail counter to a reference value;

allowing a user to enter a password;

comparing the user-entered password to a pre-determined authorized password;

decrementing the fail counter when the user-entered password matches the pre-determined authorized password;

incrementing the fail counter when the user-entered password does not match the pre-determined authorized password, and allowing said user to enter another password without delay;

granting access to said system when the fail counter reaches its reference value minus one.

2. The method according to claim 1, further comprising the step of denying access to said system whenever the fail counter equals or exceeds its reference value.

3. The method according to claim 1, wherein said step of incrementing the fail counter further comprises incrementing the fail counter by one each time the user-entered password does not match the pre-determined authorized password.

4. The method according to claim 1, wherein said step of incrementing the fail counter further comprises incrementing the fail counter exponentially each time the user-entered password does not match the pre-determined authorized password.

5. The method according to claim 1, wherein said step of incrementing the fail counter further comprises incrementing the fail counter by one for a first number of times the user-entered password does not match the pre-determined authorized password, and then incrementing the fail counter exponentially for a second number of times the user-entered password does not match the pre-determined authorized password.

6. An apparatus for controlling access to a system comprising:

an interface for allowing a user to enter a password;

a comparator for comparing the user-entered password to a pre-determined authorized password;

a fail counter coupled to said comparator and being capable of initializing to a reference value, said fail counter decrementing when the comparator indicates that the user-entered password matches the pre-determined authorized password, and said fail counter incrementing when the comparator indicates that the user-entered password does not match the pre-determined authorized password but allowing said user to enter another password without delay;

whereby said apparatus for controlling access to a system grants access to said system when the fail counter reaches its reference value minus one.

7. The apparatus according to claim 6, wherein said apparatus denies access to said system whenever the fail counter equals or exceeds its reference value.

8. The apparatus according to claim 7, wherein said fail counter increments by one each time the user-entered password does not match pre-determined authorized password.

9. The apparatus according to claim 7, wherein said fail counter increments exponentially each time the user-entered password does no it the pre-determined authorized password.

10. The apparatus according to claim 7, wherein said fail counter increments by one for a first number of times the user-entered password does not match the pre-determined authorized password, and then increments exponentially for a second number of times the user-entered password does not match the pre-determined authorized password.

* * * * *